May 21, 1968  W. S. BLANCHARD, JR  3,384,016
LATERAL DISPLACEMENT SYSTEM FOR SEPARATED ROCKET STAGES
Filed Sept. 6, 1966  2 Sheets-Sheet 1

INVENTOR
WILLARD S. BLANCHARD, JR.

BY

ATTORNEYS

May 21, 1968 W. S. BLANCHARD, JR 3,384,016
LATERAL DISPLACEMENT SYSTEM FOR SEPARATED ROCKET STAGES
Filed Sept. 6, 1966 2 Sheets-Sheet 2

INVENTOR
WILLARD S. BLANCHARD, JR.

BY

ATTORNEYS

United States Patent Office 3,384,016
Patented May 21, 1968

3,384,016
LATERAL DISPLACEMENT SYSTEM FOR
SEPARATED ROCKET STAGES
Willard S. Blanchard, Jr., Hampton, Va., assignor to the
United States of America as represented by the Administrator of the National Aeronautics and Space Administration
Filed Sept. 6, 1966, Ser. No. 577,546
7 Claims. (Cl. 102—49.5)

ABSTRACT OF THE DISCLOSURE

A system for laterally displacing connected rocket stages after separation by detonating a shaped charge mounted on the side of one of the stages to impart an instantaneous sideward force and optionally creating an opening in the stage side to permit residual outgassing, applying an additional lateral force.

---

The invention described herein was made by an employee of the United States Government and may be manufactured and used by or for the Government for governmental purposes without the payment of any royalties thereon or therefor.

This invention relates generally to a separation device for adjacent components of a rocket vehicle and more particularly to apparatus for prevention of collision between the last propulsion stage and the payload of a rocket vehicle.

Various methods and devices have been utilized previously for preventing collision of the adjacent components of a rocket vehicle or missile. For example, retrorockets, retrorockets plus tumble rockets, retrorockets plus despin rockets plus tumble rockets, spring devices and centrifugal despin devices in combination with tumble rockets or lateral displacement rockets. Although retrorockets accomplish separation of the adjacent components they are much heavier and fail to displace the last propulsion stage from the path of the payload. For a number of existing and proposed rocket vehicle configurations there is considerable danger that a collision would occur between the last propulsive stage and the payload because of residual thrust from the propulsive stage, because of differences of longitudinal decelerations between the bodies resulting from aerodynamic drag forces, or because of a combination of these factors.

For a nonspinning body the primary disadvantage of retrorockets plus tumble rockets is the increased weight. For a spinning body there is an additional disadvantage in that a much more powerful tumble rocket is required and the possibility exists that, depending on predictability of the spin rate, the body still might assume a coning mode rather than a tumbling mode which would result in possible collision. Obviously, the combination of retrorockets plus despin and tumble rockets is much heavier than either of the above two techniques with the added disadvantage that it cannot be accurately predicted that collision will be prevented because of significant errors induced by small uncertainties in the spin rate and the thrust-time characteristics of the retrorockets, despin rockets and tumble rockets.

Spring devices utilized for separation of the last propulsion stage from the payload do not deflect the propulsion stage from the flightpath and, therefore, permit the possibility of a collision resulting from residual thrust and/or differences in longitudinal decelerations attributed to aerodynamic drag forces. Centrifugal despin devices in combination with tumble rockets or lateral displacement rockets are complex, expensive and considerably heavier than the techniques of the instant invention.

In order to overcome the disadvantages of the prior art, the instant invention contemplates the use of a shaped charge responsive to a remote signal for establishing a lateral force to remove the last booster stage or propulsive unit from the flightpath of the payload.

It is an object of the instant invention to provide a safe, reliable way of preventing collision between the last propulsive stage and the payload of a rocket vehicle.

Another object of this invention is to provide a safe, reliable way of preventing collision between consecutive propulsion stages of rocket vehicles in instances where the delay time between stage separation and later propulsion stage ignition is sufficiently long to allow collision between these propulsive stages.

Another object of this invention is to provide a lightweight, inexpensive, highly reliable technique for the prevention of collision between the payloads and last propulsion stages of spinning or nonspinning launch vehicles.

A further object of the instant invention is to provide a technique for preventing collision between the payload and last propulsive stage of a launch vehicle wherein a shaped charge is detonated to provide an opening in the side of the last propulsive stage and thus initiate lateral movement thereof from the flightpath of the payload.

Still another object of this invention is to provide an activator for activating an ignitor for a shaped charge that provides lateral thrust to remove the last propulsive stage from the flightpath of the payload.

A still further object of the instant invention is to provide a collision negating technique wherein the payload and last propulsive stage of a rocket vehicle are separated and a device is activated to provide timely ignition of a shaped charge that detonates and laterally displaces the last propulsive stage from the flightpath of the payload.

Generally, the foregoing and other objects are accomplished by providing an activating device which utilizes a timing device for accurately providing power to an initiator or detonator which causes a shaped charge to detonate. Detonation of the shaped charge provides a force lateral to the flightpath of the propulsive stage as well as an opening in the side of the rocket whereby any residual pressure within the rocket casing is utilized for assisting in the lateral displacement of the propulsive stage of the rocket vehicle. A more complete appreciation of the invention and many of the attendant advantages thereof will be readily apparent as the same becomes better understood by reference to the following description when considered in connection with the accompanying drawings wherein:

Figures 1, 2:
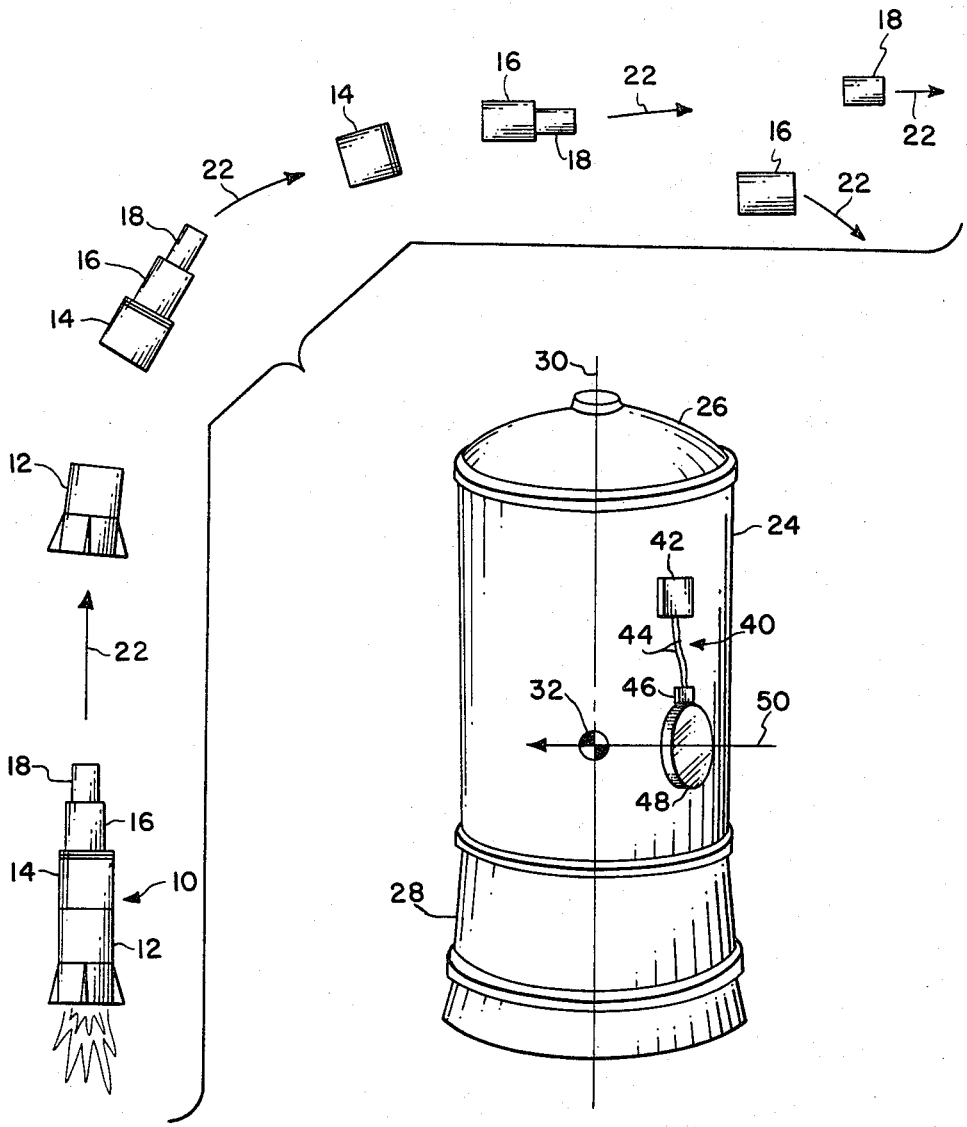
FIG. 1 is a diagrammatic view of the events occurring during launch of a typical multi-stage rocket vehicle.
FIG. 2 is an isometric view of a rocket casing incorporating a diagrammatic display of the device of the instant invention.

Referring now to the drawings and more particularly to FIG. 1 wherein rocket vehicle 10 is shown in an assembled configuration and as comprising first stage propulsive unit 12, second stage propulsive unit 14, third or last propulsive unit 16 and payload 18. For clarity, no aerodynamic shroud is shown for propulsive unit 16 since such shrouds are normally ejected prior to last stage separation and have no bearing on the instant invention. Arrows 22 indicate the general direction of the flightpath of vehicle 10 and indicate the general direction taken by the various vehicle components at sequential times during the launch of vehicle 10.

As best shown in FIG. 2 rocket casing 24 of propulsive unit 16 includes forward section 26 and after or nozzle section 28. It is to be understood that propulsive unit 16 adapter hardware, such for example as springs and associated structure, is not shown for simplicity and to avoid confusion in view of the fact that it has little or no effect on the instant invention. Center of gravity 32 of expended propulsive unit 16 is located on centerline 30 as determined by well known computations.

Figure 3:
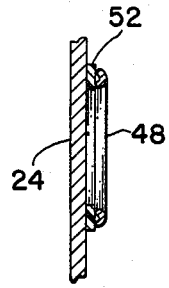
FIG. 3 is a cross-sectional view of a portion of the device utilized in the instant invention.

Negator assembly 40 is shown to include activator 42 which would comprise a timing device and a power source well within the state of the art for insuring the proper timing for activating initiator or igniter 46. Igniter 46 is of well known construction and is attached to a commercially available flexible linear shaped charge 48, shown to be of circular configuration, and causes the ignition or detonation of shaped charge 48. The mounting of the charge on one side of the stage asymmetrical to the flightpath, together with its shape, combine to produce a resultant explosive force vector 50, upon detonation. Force vector 50 generally is on a line passing through the center of shaped charge 48 and crossing centerline 30 of casing 24. The point at which vector 50 should cross centerline 30 is at the location of center of gravity 32 to provide the most efficient force for lateral displacement of last propulsive stage 16 from the flightpath of payload 18. As more clearly shown in FIG. 3, shaped charge 48 is mounted on rocket casing 24 by adhesive 52. However, it is to be understood that shaped charge 48 can be held in place against the required stand-offs of the proper height to exert the maximum force on motor case 24 by small springs, an epoxy base cement, or, as shown, by a flexible bonding agent.

Figure 4:
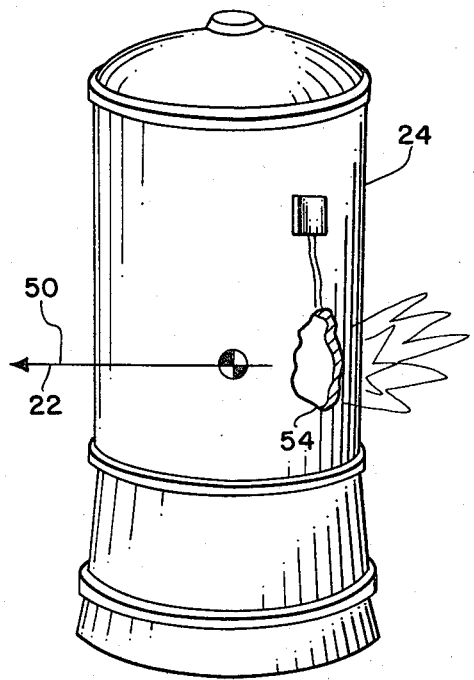
FIG. 4 is an isometric view similar to that of FIG. 2 showing the rocket casing after activation of the instant invention.

FIG. 4 shows motor casing 24 in which shaped charge 48 has been detonated to provide opening 54 that would permit release of any residual gases retained within the casing and arrow 22 which coincides with force vector 50 and indicates the direction of movement of motor case 24 and any attendant appendages which would be included in the structure of last propulsive stage 16.

Accordingly, it is seen that this invention consists of mounting a commercially available flexible linear shaped charge on the side of the last propulsive stage motor case. The charge is so positioned that the energy released upon detonation of shaped charge 48 causes an opening in the motor case the size and shape of the shaped charge pattern and, accordingly, the released energy is concentrated along vector 50 which passes through center of gravity 32 of last propulsive stage 16. The charge could be initiated approximately one quarter of a second after payload 18 has been separated from propulsion stage 16 by some device, not shown, such for example as springs. The energy released by the detonation, because of the extremely fast burning rate of shaped charge 48, is concentrated along the single radial vector 50, even at high spin rates of casing 24.

It is to be understood that there are many alternatives for various portions of the instant invention, for example the pattern of shaped charge 48 which is shown as circular can be of any configuration. In fact, it may be desirable to utilize a length and strength for shaped charge 48 in a configuration such that no opening is made in the casing and only the forces resulting from the detonation would displace the propulsive unit laterally. However, in the illustrated embodiment the cross-sectional area of opening 54 has been proven effective when approximately ten times as great as the cross-sectional area of the throat of the propulsive stage nozzle 28 and it is obvious that a plurality of shaped charges might be utilized if necessary or desirable for most efficient and economical operation. Tests conducted on the instant invention utilized shaped charges of 40 and 80 grains per foot. However, the material is commercially available in charges from 5 grains per foot to more than 200 grains per foot and, accordingly, it is probable that for some applications charges smaller or larger than those utilized in the tests will be more suitable.

The initial separation which must take place between the payload 18 and last propulsive stage 16 immediately prior to initiation of the shaped charge can be achieved by any means such for example as springs, retrorockets, hydraulic pistons or other well known devices. It is also to be recognized that the delay time between separation and charge ignition is disclosed as one quarter-of-a-second which is satisfactory for two vehicle configurations studied; however, other periods may prove to be more suitable for other configurations.

The signal used to initiate the separation and the shaped charge can come from any one of a number of sources. A logical source is a pressure switch which reads chamber pressure within the propulsion stage. Such a switch would complete the required circuit when the chamber pressure of the propulsion stage dropped to a preselected value. If necessary a delay could be provided between the switch closure and the separation maneuver. Well known delay devices are suitable for this function, as well as for the time interval between separation and shaped charge detonation.

The tests conducted have shown that the instant inventive technique is sound and that adequate lateral separation velocities can be obtained for typical configurations both in an atmosphere as well as in the vacuum of outer space. These tests have further verified that the lateral velocity attained is not significantly affected by spin rate and also have shown that the results are satisfactory with or without outgassing pressures within the propulsion stage.

Thus, it is seen that this invention provides a lightweight, inexpensive, highly reliable technique for the prevention of collision between the payload and last propulsion stage of spinning or nonspinning launch vehicles or between consecutive propulsion stages of such vehicles.

Obviously many modifications and variations of this subject invention are possible in light of the above teachings. It is therefore to be understood that within the scope of the appended claims the invention may be practiced otherwise than as specifically described.

What is claimed as new and desired to be secured by Letters Patent of United States is:

1. A system for displacing two connected stages of a rocket from alinement along the flightpath of the rocket comprising:
   separation means for separating said connected stages from each other;
   an explosive charge means producing an explosive force upon detonation;
   means producing an explosive resultant force on one of said stages along a vector lying at an angle to said flightpath by the explosive force produced by the detonation of said charge; and
   activator means operative to detonate said explosive charge upon separation of said stages, whereby said one stage is laterally displaced from the flightpath after separation of the said stages.

2. The system of claim 1 wherein said means producing an explosive resultant force includes means shaping said explosive charge to direct the explosive force produced upon detonation and further includes means arranging said charge upon said one of the stages asymmetrically with respect to said flightpath.

3. The system of claim 1 wherein said means producing an explosive resultant force further includes means alining said vector so as to pass substantially through the center of gravity of said one of said stages.

4. In combination with two connected stages of a rocket disposed in a flightpath at least one of which has a casing containing gas under pressure:
   means for separating said connected stages;
   explosive charge means mounted on said one of said stages having a casing to produce an explosive force upon detonation;

means for producing rupture of said casing in response to said explosive force; and activator means to produce detonation of said explosive charge means upon separation of said stages, whereby the resulting outgassing exerts a displacing force on said stage.

5. The combination of claim 4 wherein said means producing rupture of said casing includes means directing said explosive force at said casing.

6. The combination of claim 5 further including means directing said force directed at said casing along a vector lying at an angle to said flightpath.

7. The combination of claim 6 wherein said vector passes through the center of gravity of said one of said stages.

References Cited

UNITED STATES PATENTS

| | | | |
|---|---|---|---|
| 3,108,540 | 10/1963 | Fletcher | 102—49.5 |
| 3,180,264 | 4/1965 | Webb | 102—24 |
| 3,185,090 | 5/1965 | Weber | 102—49.5 |
| 3,311,324 | 3/1966 | Holt et al. | 102—24 |

FOREIGN PATENTS 655,921  8/1951  Great Britain.

BENJAMIN A. BORCHELT, *Primary Examiner.*

SAMUEL FEINBERG, *Examiner.*

V. R. PENDEGRASS, *Assistant Examiner.*